(12) United States Patent
McEwan

(10) Patent No.: US 6,191,724 B1
(45) Date of Patent: Feb. 20, 2001

(54) SHORT PULSE MICROWAVE TRANSCEIVER

(76) Inventor: Thomas E. McEwan, 30772 San Remo Dr., Carmel Highlands, CA (US) 93923

(*) Notice: Under 35 U.S.C. 154(b), the term of this patent shall be extended for 0 days.

(21) Appl. No.: 09/238,455

(22) Filed: Jan. 28, 1999

(51) Int. Cl.⁷ .............................. G01S 7/28; G01S 13/88
(52) U.S. Cl. ................................. 342/21; 342/22; 342/27; 342/28; 342/118; 342/124; 342/135; 342/175; 342/195
(58) Field of Search ................................. 342/21, 22, 24, 342/27, 28, 88, 118, 124, 135, 175, 194, 195, 204

(56) References Cited

U.S. PATENT DOCUMENTS

| | | | |
|---|---|---|---|
| 4,099,228 | | 7/1978 | Cohn ..................................... 363/159 |
| 4,200,871 | * | 4/1980 | Roeder et al. ......................... 342/78 |
| 4,319,244 | | 3/1982 | Hirota et al. .............................. 343/8 |
| 4,320,536 | | 3/1982 | Dietrich ................................. 455/325 |
| 4,334,314 | * | 6/1982 | Nard et al. ............................ 375/362 |
| 4,470,049 | | 9/1984 | Phaneuf et al. .................. 343/17.1 R |
| 4,518,931 | | 5/1985 | Rauscher ................................. 331/76 |
| 4,539,530 | | 9/1985 | Mizumura et al. .............. 331/117 R |
| 4,743,906 | | 5/1988 | Fullerton ................................. 342/27 |
| 4,810,976 | | 3/1989 | Cowley et al. ................... 331/117 R |
| 4,817,201 | | 3/1989 | Bonato ................................. 455/325 |
| 4,862,175 | * | 8/1989 | Biggs et al. ............................ 342/20 |
| 4,891,649 | * | 1/1990 | Labaar et al. ......................... 342/203 |
| 4,951,060 | | 8/1990 | Cohn ..................................... 342/175 |
| 5,146,616 | * | 9/1992 | Tang et al. ............................ 455/103 |
| 5,226,061 | * | 7/1993 | Van Der Veen ...................... 375/309 |
| 5,239,309 | * | 8/1993 | Tang et al. ............................. 342/13 |
| 5,345,601 | | 9/1994 | Takagi et al. ............................ 455/59 |
| 5,361,070 | * | 11/1994 | McEwan ................................. 342/21 |
| 5,457,394 | * | 10/1995 | McEwan ................................. 324/642 |
| 5,519,400 | * | 5/1996 | McEwan ................................. 342/28 |
| 5,521,600 | * | 5/1996 | McEwan ................................. 342/27 |
| 5,563,605 | * | 10/1996 | McEwan ................................. 342/202 |
| 5,576,837 | | 11/1996 | Strolle et al. ............................ 386/33 |
| 5,609,059 | * | 3/1997 | McEwan ............................. 73/290 R |
| 5,708,377 | * | 1/1998 | Bradley .................................... 327/91 |
| 5,757,320 | * | 5/1998 | McEwan ............................... 342/387 |
| 5,774,091 | * | 6/1998 | McEwan ............................... 342/387 |
| 5,805,110 | * | 9/1998 | McEwan ............................... 342/387 |
| 5,818,582 | | 10/1998 | Fernandez et al. .................. 356/318 |
| 5,966,090 | * | 10/1999 | McEwan ................................. 342/27 |
| 5,986,600 | * | 11/1999 | McEwan ................................. 342/28 |
| 5,999,561 | * | 12/1999 | Naden et al. ......................... 375/142 |
| 6,072,427 | * | 4/2000 | McEwan ............................... 342/175 |

OTHER PUBLICATIONS

Maas, Stephen A., "Microwave Mixers", Second Edition, Artech House, Inc., (1993), pp. 277–280.

* cited by examiner

*Primary Examiner*—John B. Sotomayor
(74) *Attorney, Agent, or Firm*—Mark A. Haynes; Haynes & Beffel LLP

(57) ABSTRACT

Harmonic techniques are employed to leverage low-cost, ordinary surface mount technology (SMT) to high microwave frequencies where tight beamforming with a small antenna makes reliable, high-accuracy pulse-echo radar systems possible. The implementation comprises a 24 GHz short-pulse transceiver comprised of a pulsed harmonic oscillator employed as a transmitter and an integrating, pulsed harmonic sampler employed as a receiver. The transmit oscillator generates a very short (0.5 ns) phase-coherent harmonic-rich oscillation at a sub-multiple of the actual transmitter frequency. A receiver local oscillator operates at a sub-multiple of the transmit frequency and is triggered with controlled timing to provide a very short (0.5 ns), phase-coherent local oscillator burst. The local oscillator burst is coupled to an integrating harmonic sampler to produce an integrated, equivalent-time replica of the received RF. The harmonic techniques overcome four major problems with non-harmonic approaches: 1) expensive, precision assembly, 2) high local oscillator noise, 3) sluggish oscillator startup, and 4) spurious local oscillator injection locking on external RF. The transceiver can be used for automotive backup and collision warning, precision radar rangefinding for fluid level sensing and robotics, precision radiolocation, wideband communications, and time-resolved holographic imaging.

45 Claims, 6 Drawing Sheets

SHORT PULSE MICROWAVE TRANSCEIVER

BACKGROUND OF THE INVENTION

1. Field of the Invention

The present invention relates to wide bandwidth pulsed microwave transmitters and receivers, and more particularly to short-range, sub-nanosecond pulse, phase-coherent K-band radars.

2. Description of Related Art

Range measurement of close-range targets is of great interest to a number of industries. Automotive backup warning radar, fluid level sensing in tanks and vats, material level sensing in silos, safety systems, home "do-it-yourself" projects, and aids to the blind are but a few of the applications for short-range non-contact range measurement. Radar range measurement appears to be the technology of choice but has yet to make significant penetration into these markets. The main shortcoming with radar has been the difficulty in realizing a low-cost short-pulse radar with a narrow antenna beam.

A potentially suitable radar is ultra-wideband (UWB) radar, for example, ground penetrating radar as disclosed in U.S. Pat. No. 4,698,634 by Alongi or Micropower Impulse Radar (MIR) in U.S. Pat. No. 5,774,091 by McEwan. UWB radar emits suitably short pulses (<1ns) but has serious drawbacks; its low frequency spectrum can create interference with countless other spectrum users below 3 GHz, and its low frequency spectrum (i.e., long wavelength) prevents narrow antenna beam formation with a compact antenna.

Ultrasound is a potential technology that is both simple and inexpensive. Unfortunately, it is of limited accuracy since the speed of sound varies 10% over outdoor temperatures. Accuracy is of central importance in tank level measurements and construction applications, and 10% accuracy is simply not consistent with modern requirements. Accuracies of 1% to 0.01% are needed. These accuracies can be met with pulse-echo radar using precision timing techniques as will be described herein.

In addition to limited accuracy, ultrasound is susceptible to extraneous acoustic noise, and water or dirt overcoatings on its transducers can disable it. In spite of these limitations, ultrasound has been a popular ranging technology due to its simplicity and its ability to form a narrow beam with a small transducer. A narrow beam is needed to reduce clutter reflections from off-axis objects, such as a tank wall. A narrow beam also implies high antenna gain, which improves signal to noise (S/N) ratio.

While both limited and antiquated, ultrasonic rangefinding remains the dominant non-contact range measurement technology since there have been no real alternatives. One might consider an optical approach to rangefinding, such as a laser rangefinder or a video system. However, optical systems also lack environmental ruggedness—the optics cannot be located behind a decorative panel and can be disabled by an overcoating of water, snow, ice or dirt. Clearly, a better technology is needed.

Radar rangefinders are environmentally rugged: the speed of light (at which radar waves travel) does not vary with temperature (for all practical purposes), and radar waves propagate freely through wood walls, gypsum walls and plastic panels, even with an overcoating of water, ice, snow or dirt.

Pulse-echo radars operating in the 24 GHz band have a wavelength of 12.5 mm, which is almost exactly the same wavelength as 25 KHz ultrasound. Since antenna beamwidth is determined by the wavelength to antenna aperture ratio, radar and ultrasound will have comparably narrow beamwidths with the same antenna/transducer footprint.

An ultrasonic rangefinder may typically transmit a burst of 12 sinusoidal cycles of acoustic energy with a corresponding pulse width that defines the two-object resolution of the system. Of course, its incremental resolution is not a function of emitted pulse width, but that of the timing system. A 24 GHz radar with the same two-object resolution as the 12-cycle ultrasound system needs to transmit a 12 cycle, 0.5-nanosecond sinusoidal burst at 24 GHz, since the wavelengths are comparable. Clearly, the radar needs to have a wide bandwidth, on the order of 1–2 GHz.

Prior art pulse echo radars do not exhibit the combination of 1) K-band RF operation, e.g., 24 GHz, 2) sub-nanosecond RF pulse width, 3) extreme phase coherence (<10-picoseconds for the entire transmit-receive system, 4) expanded time output with ultrasonic parameters, 5) simple assembly with low cost surface mount technology (SMT) components, and 6) commercially appealing size and cost. Clearly, a new technology is needed.

Attempts by the present inventor to develop a 24 GHz radar rangefinder using SMT components were met with frustration and failure—a quarter wavelength at 24 GHz is 3 mm or even less when material dielectric constants are included. Since SMT components have dimensions on the order of 3 mm, wavelength effects are a severe limitation.

One approach to counter the effect of diminishing wavelength is to decrease component size with monolithic technology such as GaAs MMIC (monolithic microwave integrated circuit). Unfortunately, the high cost of GaAs MMIC, about $10 per chip, puts radar in an uncompetitive position relative to ultrasound, which can be fully implemented on a single low cost silicon chip. A pulse-echo radar system with transmit and receive MMICs, and support circuitry might cost $50 to manufacture, after factoring-in expensive assembly techniques for very small high bandwidth components and special circuit board materials. In contrast, a complete ultrasound system can be manufactured for under $5.

SUMMARY OF THE INVENTION

One solution to the cost problem of a radar rangefinder is to employ SMT components with as few microwave semiconductors as possible. To implement this approach, unique wide-bandwidth harmonic techniques were developed for the present invention. Accordingly, a pulsed transmit oscillator operates at a sub-multiple of a transmit frequency and a strong harmonic is extracted for transmission. Similarly, a pulsed local oscillator in the receiver operates at one-half or one-quarter the transmit frequency and drives a harmonic sampler operating at the transmit frequency. Thus, all the critical microwave components operate at frequencies where SMT components are viable, typically at less than 15 GHz.

In a typical radar configuration, the transmit oscillator is connected to an antenna which radiates a short RF burst at a harmonic frequency. Echo bursts are received by a receive antenna and sampled by a harmonic sampler that is driven by a sub-harmonic (to the radiated frequency) RF burst. The timing of the RF burst is slowly swept to produce an equivalent time analog replica of the received echo burst, which can be used to determine target characteristics such as size and range.

In a preferred embodiment, the transmitter of the present invention uses a single, pulsed GaAsFET transistor operating at 12 GHz and frequency doubled to 24 GHz using a resonant antenna and a waveguide beyond cutoff to extract the desired second harmonic. The GaAsFET is the same as that used by "Dish" TV systems, so its cost has been driven down by this popular consumer electronics technology to about $1 in volume.

The receiver in the preferred embodiment uses a silicon transistor operating in a short pulse mode at 6 GHz and effectively frequency quadrupled to 24 GHz by a harmonic sampler. The silicon transistor cost is 15 cents in volume. The only other microwave semiconductor component in the system is the detector diode. The present invention uniquely employs a simple technique to double the bandwidth of commercially available SMT detector diodes, thereby allowing the use of a 70-cent detector diode. With an RF lineup costing under $2, it is quite feasible to manufacture a complete 24 GHz rangefinder for under $5, or about ten times lower than the GaAs MMIC approach.

The present invention emits a short sinusoidal RF burst containing a limited number of cycles, such as 12 RF cycles. Thus, there is a need to generate 500-picosecond wide RF bursts at 24 GHz. As a further constraint, the sinusoidal cycles within the RF burst must be phase coherent with the timing pulses that trigger the burst, i.e., the trigger jitter must be less than one-quarter of an RF cycle (10-picoseconds), and ideally on the order of 1-picosecond. The technology to do this cannot be found in the prior art.

To simplify signal processing and to make the entire rangefinder practical, the present invention employs expanded time techniques, also known as equivalent time (ET). ET is a beat-frequency effect produced by sampling echoes at a slightly slower rate than the transmitted pulse rate. The net effect is very similar to shining a strobe light on a fan blade, and adjusting the strobe frequency so the blade appears to rotate very slowly. By this analogy, the rapidly rotating fan blade represents the realtime pulses travelling at the speed of light, the strobe is an electronic gate in the receiver (or the pulsed local oscillator and harmonic sampler described herein), and the slowly rotating visual effect is the expanded time radar video output. "Video" is used here in the common radar parlance, and is not to be confused with television or visual signals.

An ET pulse-echo radar system transmits pulses, and after a delay its receiver is gated at a particular point in time, or equivalently, in range. The timing of the gate is typically swept across a range of delays (e.g., 0–100 ns) in a matter of milliseconds, such that the receiver video output is a scan-like waveform which replicates events occurring on a realtime 0–100 ns scale by an equivalent time millisecond-scale. Equivalent time techniques are commonly used in wideband sampling oscilloscopes and will not be dwelt upon here. What is novel in this invention is the use of a very short (e.g., 0.5 ns) sub-harmonic microwave RF burst as the sampling gate, particularly where the microwave burst is a sub-harmonic of the received RF pulse. As a further enhancement, the sampling gate, or harmonic sampler of the present invention, coherently integrates multiple repetitions of the received microwave RF pulses.

Precision timing circuits are required for accurate equivalent time systems. Timing circuits having scale factor accuracies on the order of several tens of picoseconds or better can be realized with a Delay Locked Loop (DLL) such as a "Precision Digital Pulse Phase Generator" as disclosed by McEwan in U.S. Pat. No. 5,563,605, or in copending application, "Phase-Comparator-Less Delay Locked Loop", Ser. No. 09/084,541, by McEwan. Alternatively, dual crystal clocks, one for transmit and one for receive, can be employed, where the receive clock is locked to a small offset frequency from the transmit clock, such as 100 Hz, thereby causing a steady phase slip of one complete clock cycle 100 times per second. In the process, the receive sampler timing smoothly sweeps across one complete pulse repetition interval (e.g., a PRI=100 ns for a 10 MHz clock) every 10 ms in equivalent time.

The present invention is a precision radar rangefinder employing pulsed harmonic techniques and low cost manufacturing technology. It can be used in low cost radars for tank level measurements, including 0.01% accurate custody transfer measurements, industrial and robotic controls, vehicle backup warning and collision radars, and general rangefinding applications. While illustrated with reference to a radar rangefinder, the invention also encompasses other pulsed RF systems, including (1) precision time-of-flight and time-of-arrival radiolocation systems similar to U.S. Pat. Nos. 5,510,800 and 5,661,490, both by McEwan, (2) wideband pulsed-RF communication systems, and (3) holographic imaging systems. Since the present invention is phase coherent, microwave holograms can be formed using techniques known in the art, where the customary holographic reference beam is conveniently replaced by the internal phase coherent timing of the present invention.

A primary object of the present invention is to provide a precision, low cost radar ranging system with a narrow beamwidth using a small antenna.

Yet another object of the present invention is to provide a radar ranging system with an expanded-time video output signal that is similar to an ultrasonic rangefinder signal to facilitate low cost and low power signal processing.

Still another object of the present invention is to provide a K-band harmonic oscillator and harmonic sampler that can be fabricated with common surface mount components.

BRIEF DESCRIPTION OF THE DRAWINGS

FIG. 6b is a physical layout diagram of the short pulse fundamental oscillator of FIG. 6a.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. patents and copending U.S. applications cited herein are herein incorporated by reference.

Figure 1:
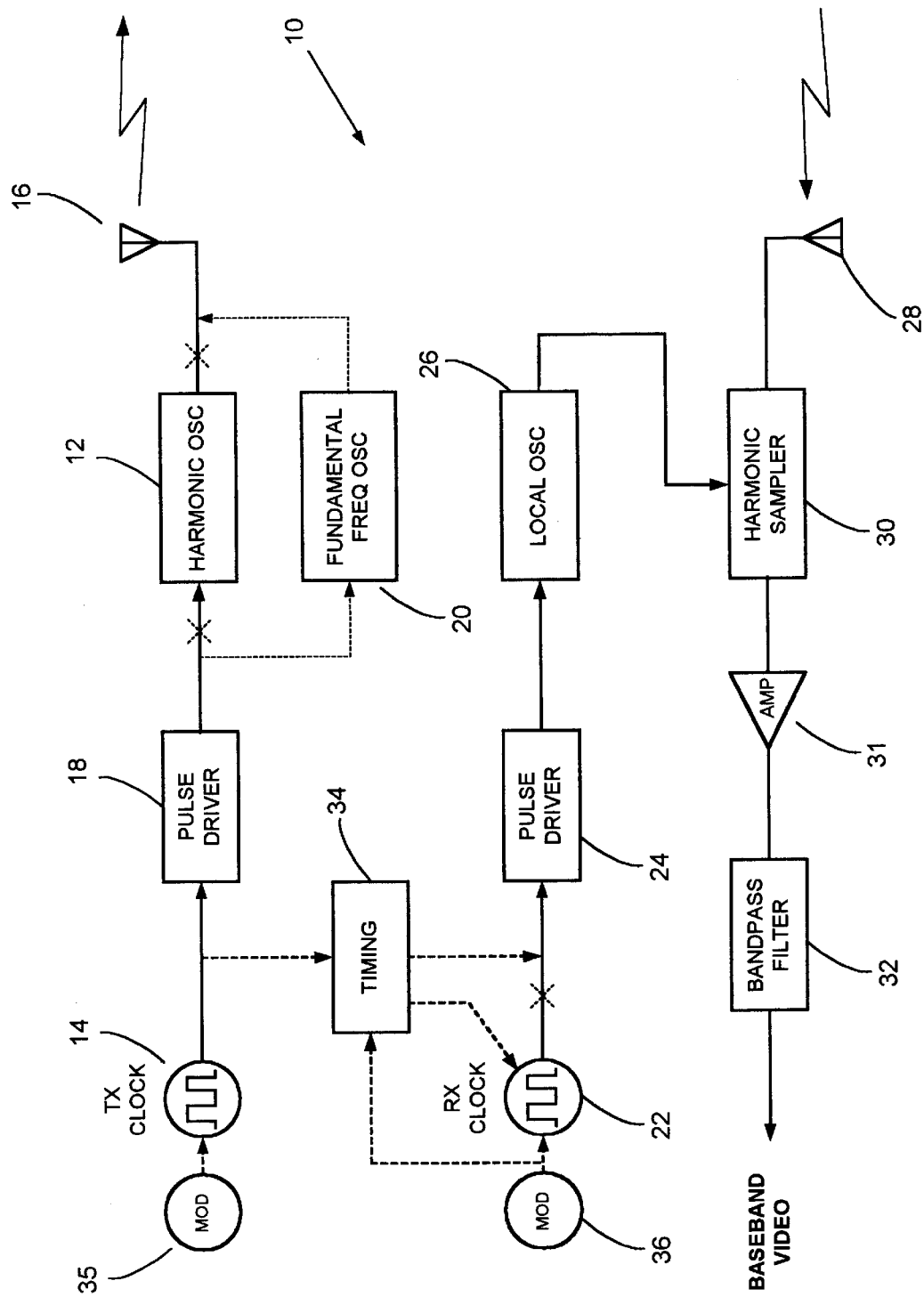
FIG. 1 is a block diagram showing the short pulse microwave transceiver of the present invention.

FIG. 1 is a block diagram of a microwave transceiver 10 of the present invention. A harmonic oscillator 12 receives clock pulses from TX clock 14 via pulse driver 18 and produces RF burst pulses (transmit pulses) at the transmit antenna 16. TX Clock 14 typically produces a 1–10 MHz squarewave that is passed through a pulse driver 18 to form ~1 ns wide pulses with rise and fall times below 100 ps. Thus, the drive pulses are clock pulses with very fast rise and fall times. Therefore, the TX clock 14 and pulse driver 18 may together be viewed as a clock signal generator. Alternatively, if TX clock 14 produces fast rise and fall time pulses, a separate driver 18 is not required. These short pulses bias-on the harmonic oscillator, which designed to start and stop oscillating very rapidly as a function of applied bias. The oscillations are phase coherent with the drive pulses, i.e., the phase of the RF sinusoids relative to the drive pulse remains constant each time the oscillator is started—there is no significant clock-to-RF jitter.

A high degree of phase coherence can only be obtained with a very fast risetime drive pulse that shock excites the oscillator into oscillation. Accordingly, the pulse drivers of the present invention have risetimes of typically less than 100 ps.

Harmonic oscillator 12 typically operates at a fundamental frequency of 12.05 GHz with a second harmonic at 24.1 GHz. A frequency of 24.1 GHz or thereabouts is preferred since commercial and consumer devices such as radar rangefinders can operate in the 24.0–24.25 GHz band without a license. The transmitted RF bursts are typically 12 cycles long at a carrier frequency of 24.1 GHz.

In a less preferred mode, a fundamental frequency oscillator 20 operating at 24.1 GHz can be used instead of a harmonic oscillator 12. A fundamental mode oscillator has a higher output amplitude but is far more difficult to implement in surface mount technology (SMT) since the operating quarter-wavelength at 24 GHz is 3 mm, about the same length as a SMT transistor package (including leads) that would be used for the oscillator. Obtaining oscillations in a SMT package at 24 GHz is nearly impossible. The present invention solves that problem in a fashion that will be discussed with reference to FIGS. 6a and 6b below. However, the required physical layout does not conform to common SMT design rules and is thus less desirable than a harmonic oscillator operating at 12 GHz where standard SMT layout rules can be adhered to.

A receive (RX) clock 22 typically produces a 1–10 MHz squarewave that is passed through a pulse driver 24 to form ~1 ns wide pulses with rise and fall times below 100 ps. These short pulses bias-on the local oscillator 26, which is designed to commence oscillation very rapidly. The local oscillator operates at a sub-harmonic of 24.1 GHz, i.e., 12.05 GHz or 6.025 GHz. The 0.5 ns wide RF bursts generated by the local oscillator gate the harmonic sampler 30 to form a detected signal that is amplified by a low frequency amplifier 31 and filtered in bandpass filter 32 to produce a baseband video signal.

The RX clock 22 is typically swept in time relative to the TX clock 14. Sweeping is realized by operating the RX clock 22 at a slightly lower, or offset, frequency than TX clock 14. Typically, the TX clock is a first quartz crystal oscillator, and the RX clock is a second quartz crystal oscillator that is phase locked to a typical offset of 100 Hz from the TX clock, such that the phase of the RX clock slips one full pulse repetition interval (PRI) every 10 ms. In this case, timing control unit 34 performs a phase-lock function between the TX and RX oscillators.

Alternatively, a swept delay RX clock can be realized by the timing control unit 34 alone (acting as a delay element with controlled delay), when connected between TX clock 14 and pulse driver 24, with the offset frequency RX clock 22 omitted and timing control unit 34 providing the RX clock. A means to accomplish precision swept timing has been described in co-pending application "Phase-Comparator-Less Delay Locked Loop," Ser. No. 09/084, 541, by McEwan, which exhibits 0.01% linearity across a 10-meter measurement range.

With either type of swept timing, an equivalent time (ET) replica of the transmitted RF signal radiated from antenna 16 and received by antenna 18 (or from a remote transmitter in the case of a radiolocation or communication system) appears at the harmonic sampler 30 output. The ET replica resembles the RF signal, except it occurs on a slow time scale such as 10 ms. FIG. 3d provides an example of an ET replica signal on a 2-millisecond/div scale. In the typical case where the local oscillator RF pulse width contains more than one RF cycle, the ET output is broadened somewhat by the convolution of the harmonic oscillator pulse and the local oscillator pulse.

The TX clock 14 can be modulated in frequency or phase, or with ON-OFF gating by optional modulator 35 for various purposes known in the art, such as spreading the spectral lines generated by harmonic oscillator 12 to reduce interference to other spectrum users. The modulation may be coded to distinguish the desired received signal from that of others. Modulator 36 is connected to the RX clock 22 or timing circuit 34 to demodulate coded signals from a remote transmitter using synchronization means know in the art of spread spectrum radio technology.

Figure 2:
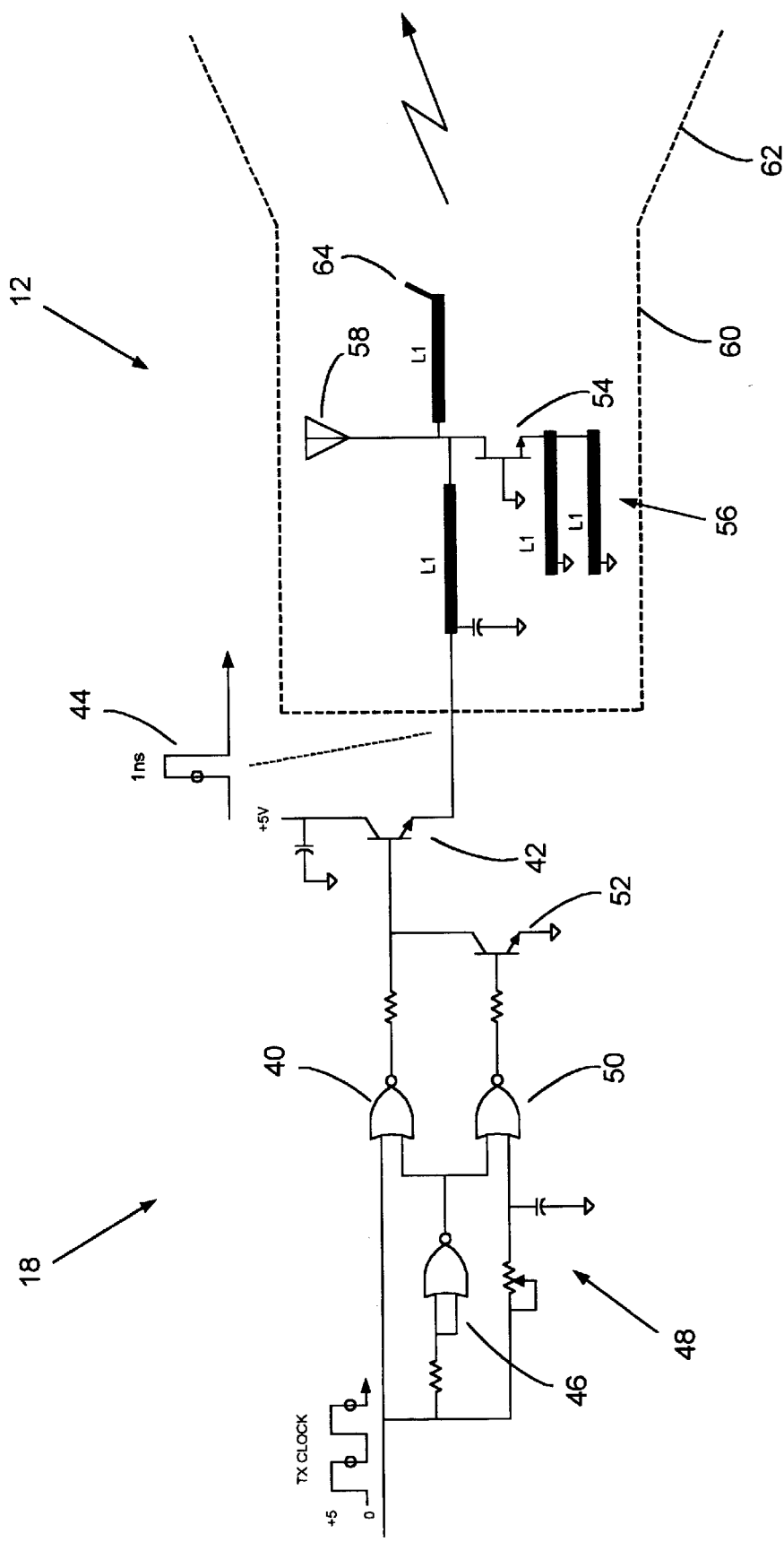
FIG. 2 is a schematic diagram of a pulse driver and harmonic oscillator of the present invention.

FIG. 2 is a detailed schematic of the pulse driver 18 and harmonic oscillator 12 (which form the transmitter) of the present invention. The TX clock signal is coupled through NOR gate 40 and emitter follower transistor 42 to provide a gate pulse 44 with a fast risetime. NOR gate 46 is coupled to NOR gate 40 to limit the pulse width from NOR gate 40. The TX clock signal is also coupled through an adjustable RC delay network 48, NOR gate 50, and inverter transistor 52 to switch the gate pulse 44 to a low level (ground level) after a delay set by RC network 48. RC network 48 can be adjusted to provide gate pulse widths from 0 to 10 ns, typically.

The particular setting of the gate pulse width depends on the RF parameters required of the RF system. Very short RF pulses are needed for high spatial resolution or for high data rate systems, whereas wide pulses allow for a lower bandwidth bandpass filter 32 (at the video output) and thus better signal to noise ratio. Also, the RF pulse width may be limited by regulatory constraints where an overly short pulse may have excessive bandwidth.

Harmonic oscillator 12 is comprised of a GaAsFET 54, several microstrip resonators 56 (labeled L1) connected to the source and drain of GaAsFET 54, and antenna 58 connected to the drain. The microstrip resonators 56 are all approximately one-quarter wavelength long at the fundamental frequency of oscillation, which is 12.05 GHz for a 24.1 GHz radiated frequency. Antenna 58 is one-quarter wavelength long at the second harmonic, or 24.1 GHz. Thus, it resonates and provides a low impedance to the drain of the GaAsFET for maximum harmonic extraction. Experiments show that second harmonic generation at 24.1 GHz is only 7 dB lower than the same transistor operating in the fundamental mode at a frequency of 24.1 GHz.

One of the microstrip resonators has a short wire or metal tab 64 attached to it to fine-tune the oscillator. During production the tab 64 can be bent to vary its capacitance to ground and thereby tune the RF frequency. Alternatively, a metal screw can be brought close to one of the microstrips for fine-tuning.

The entire oscillator circuit 12 is placed inside a waveguide 60 that operates beyond cutoff at 12 GHz to substantially reduce unwanted radiation at the 12 GHz fundamental frequency. Thus, waveguide 60 is somewhat greater than one-quarter wavelength high (so the quarter-wave antenna fits inside) and one-half wavelength wide at 24 GHz. A horn 62 is coupled to the waveguide to provide gain and reduce sidelobe radiation. In one prototype, the horn flares from 4×6 mm to 20×50 mm and provides about 18 dB gain at 24 GHz.

Harmonic oscillator 12 operates at 12 GHz (but produces a transmit signal at 24 GHz) and has three key advantages over a fundamental mode oscillator 20 (described with reference to FIGS. 6a and 6b below) operating at 24 GHz. First, all the microstrip dimensions are twice as long. This is critical, since the microstrip dimensions at 24 GHz become smaller than the SMT transistor leads. Second, the harmonic oscillator can start up very rapidly since the GaAsFET has much higher gain at 12 GHz than at 24 GHz. This is particularly true when package parasitics are factored in. There appears to be a "wall" at about 22 GHz, beyond which SMT devices will not oscillate without special layout techniques (as seen in FIG. 6b).

The third advantage to a harmonic oscillator is that the startup phase of oscillation is very independent of external RF at double frequency, i.e., received signals at 24 GHz. To illustrate this injection locking problem, experiments show that the slightest RF present at 24 GHz will alter both the startup phase and the oscillation envelope risetime of a 24 GHz oscillator. Consequently, vitally needed phase coherence is lost, and when the oscillator is used as a local oscillator, the modulated local oscillator envelope causes extremely high noise in the detector.

In contrast, external 24 GHz RF has essentially no effect on the same oscillator when operated at 12 GHz. This is a critical factor in the present invention, which makes use of a high degree of phase coherence between the drive pulse and the emitted and detected RF pulse. The typical jitter between the drive pulse and the transmitted RF pulse is on the order of 1 ps. If the jitter exceeds one-quarter of an RF cycle, or 1 Ops for a 24 GHz system, the detected signal will degrade substantially. This is due to the fact that the harmonic sampler detects and holds the received RF signal over more than one clock cycle. In other words, the transceiver coherently integrates more than one pulse, and multiple pulse integration of random phase pulses will integrate to zero, and not to the desired signal. This will be further explained with reference to FIG. 4 below.

GaAsFET transistor 54 is a NEC type NE42484A, silicon bipolar transistors 42 and 52 are NEC type NE68533, and NOR gates 40, 46, 50 are type 74AC02.

Figure 3A:
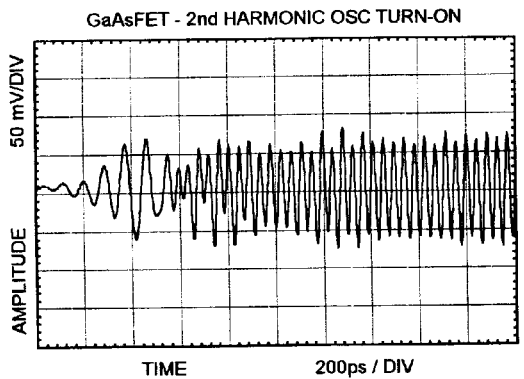
FIG. 3a shows the waveform at the antenna terminal of the harmonic oscillator of FIG. 2.

FIG. 3a shows the startup waveform of the harmonic oscillator of FIG. 2. At the onset of oscillation, a fundamental frequency oscillation occurs at 12 GHz. This quickly breaks into 24 GHz oscillations as the oscillation progresses, even though measurements at the source of the GaAsFET indicate the transistor continues to oscillate at 12 GHz. The oscillation at the drain of the GaAsFET is dominated by the second harmonic at 24 GHz due to the attachment of a 24 GHz resonant antenna.

Figure 3B:
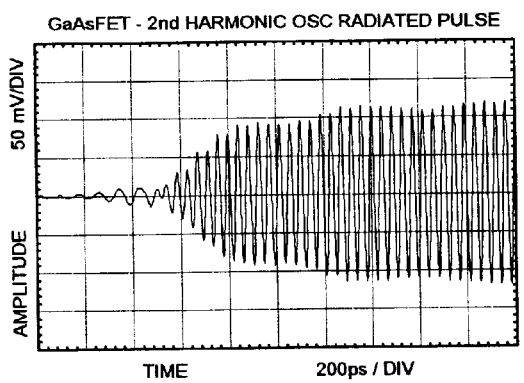
FIG. 3b shows the radiated waveform of the harmonic oscillator of FIG. 2.

FIG. 3b shows the radiated waveform of the harmonic oscillator of FIG. 2, after exiting the waveguide. The waveguide filters out the 12 GHz fundamental. The radiated second harmonic at 24 GHz is about +3 dBm in amplitude.

Figure 3C:
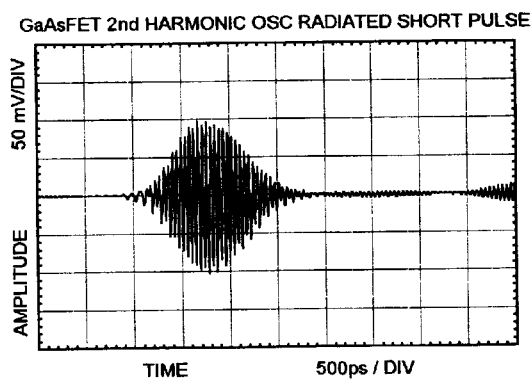
FIG. 3c shows the radiated waveform of the harmonic oscillator of FIG. 2 with the RF pulse width adjusted to a minimum.
Figure 3D:
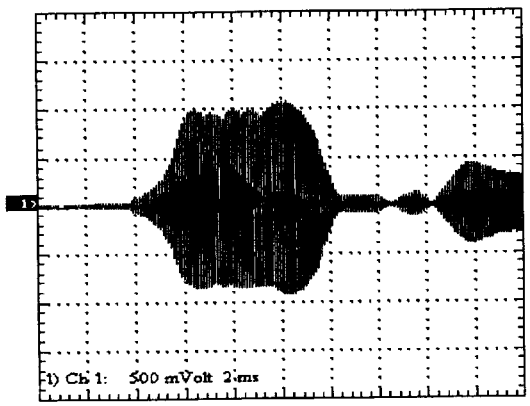
FIG. 3d shows the detected baseband video waveform of a pulse transmitted and received by the system of FIG. 1 using the transmitter of FIG. 2 and the receiver of FIG. 4. The waveform represents a target reflection at 5-meters range.

FIG. 3c shows the waveform of the harmonic oscillator of FIG. 3b on a slower time scale (500 ps/div) and with the RC delay network 48 of FIG. 2 adjusted for a minimum RF pulse width, or about 0.5 ns.

Figure 4:
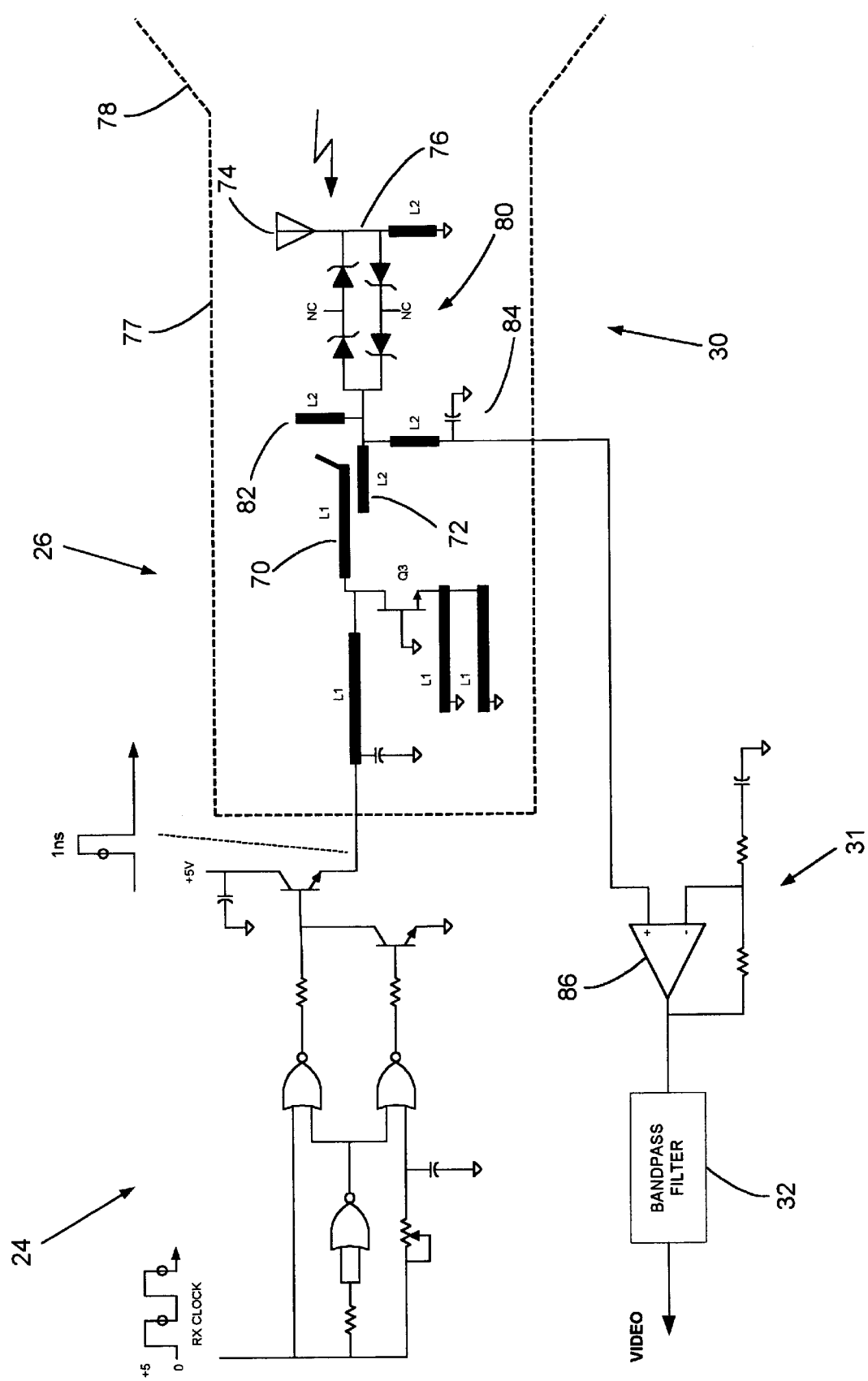
FIG. 4 is a schematic diagram of a pulse driver, a GaAsFET oscillator, and a harmonic sampler of the present invention.

FIG. 3d shows the detected video waveform of an echo from a metal plate at 5-meters range using the 24 GHz harmonic oscillator of FIG. 2 and the harmonic sampler of FIG. 4. It is an equivalent time waveform on a 2-millisecond per division scale that represents an 800 ps/div real time scale. The RC delay network 48 was adjusted to provide a ~2 ns RF pulse width from the harmonic oscillator of FIG. 2.

FIG. 4 is a detailed schematic of the pulse driver 24, local oscillator 26, and a frequency doubling harmonic sampler 30 (which form the receiver) of the present invention. Pulse driver 24 is identical to pulse driver 18 of FIGS. 1 and 2. Local oscillator 26 is essentially the same oscillator 12 of FIGS. 1 and 2, except it has no antenna connection to the GaAsFET Q3. Instead a 12 GHz quarter-wave microstrip resonator 70 is coupled to a 24 Ghz quarter-wave microstrip resonator 72 in the harmonic sampler circuit 30. Thus 12 GHz oscillations are provided to the harmonic sampler local oscillator port, i.e., microstrip 72, and 24 GHz signals are provided at its RF input port 76 to which receiver antenna 74 is connected. Antenna 74 is a 24 GHz quarter-wave monopole located in a 6 mm-wide waveguide 77. The waveguide has a horn 78 attached as described with reference to FIG. 2. The waveguide cuts off below 24 GHz, thereby preventing interference from low frequency sources.

The microstrip resonators L1 connected to Q3 including coupling resonator 70, are all approximately one-quarter wavelength long at the fundamental frequency of oscillation of Q3, i.e., 12 GHz. The microstrip resonators L2 connected to harmonic sampler 30 are all approximately one-quarter wavelength long at the received frequency, i.e., 24 GHz. A quarter-wave microstrip L2 is connected to RF input port 76, and operates as described in reference to FIG. 5.

Sampler diodes 80 are connected as series pairs and then as back-to-back (or anti-parallel) pairs. The diodes are connected in series to cut the lead-to-lead capacitance in half. Yet the lead-to-lead inductance of two leads in a series connection remains about the same as two leads for a single diode. This assumes the diodes are on a common substrate and packaged in a single SMT package. The inductance between the diodes connected in series is limited to a small on-chip inductance and is negligible compared to the lead inductance of the package. Experiments show that a single 0.25 pF Schottky diode in a small SMT package has a detector bandwidth of about 10 GHz, whereas the series pair has a bandwidth of greater than 20 GHz, without matching. Schottky sampling diodes 80 are HP type HSMS-286C and the op amp 86 of low frequency amp 31 is a TI type TLO71.

The back-to-back connection of detector diodes 80 results in conduction on each half cycle of the 12 GHz oscillation provided by the local oscillator 26. The net effect is the same as a single diode conducting on every full cycle of a 24 GHz local oscillator. Accordingly, the sampler 30 operates on the second harmonic of the local oscillator 26. Experiments show that this frequency doubling harmonic sampler has nearly the same sensitivity as a non-harmonic 24 GHz local oscillator and sampler.

In addition to harmonic sampling, a key advantage to the back-to-back diode connection is rejection of local oscillator noise, since the back-to-back connection develops zero offset bias (in principle), and consequently there can be little noise due to the local oscillator. Tests show that the 12 GHz GaAsFET circuit of FIG. 4 can achieve the same noise performance as the 6 GHz silicon bipolar local oscillator of FIG. 5 below, when either is configured to harmonically sample at 24 GHz. The advantage of the GaAsFET is that it can generate a shorter RF burst than the silicon bipolar oscillator, and consequently, the 24 GHz harmonic sampler 30 will have wider bandwidth.

Quarter wave microstrip 82 provides an RF short at 24 GHz to the video output end of the sampler to prevent RF leakage out to the amplifier 31. It also enhances the detection efficiency of diodes 80. Amplifier 31 amplitude-scales and impedance-buffers the detected signal. The signal is then passed through a bandpass filter 32 to limit noise and, in some cases, to provide Doppler filtering for velocity discrimination.

Figure 5:
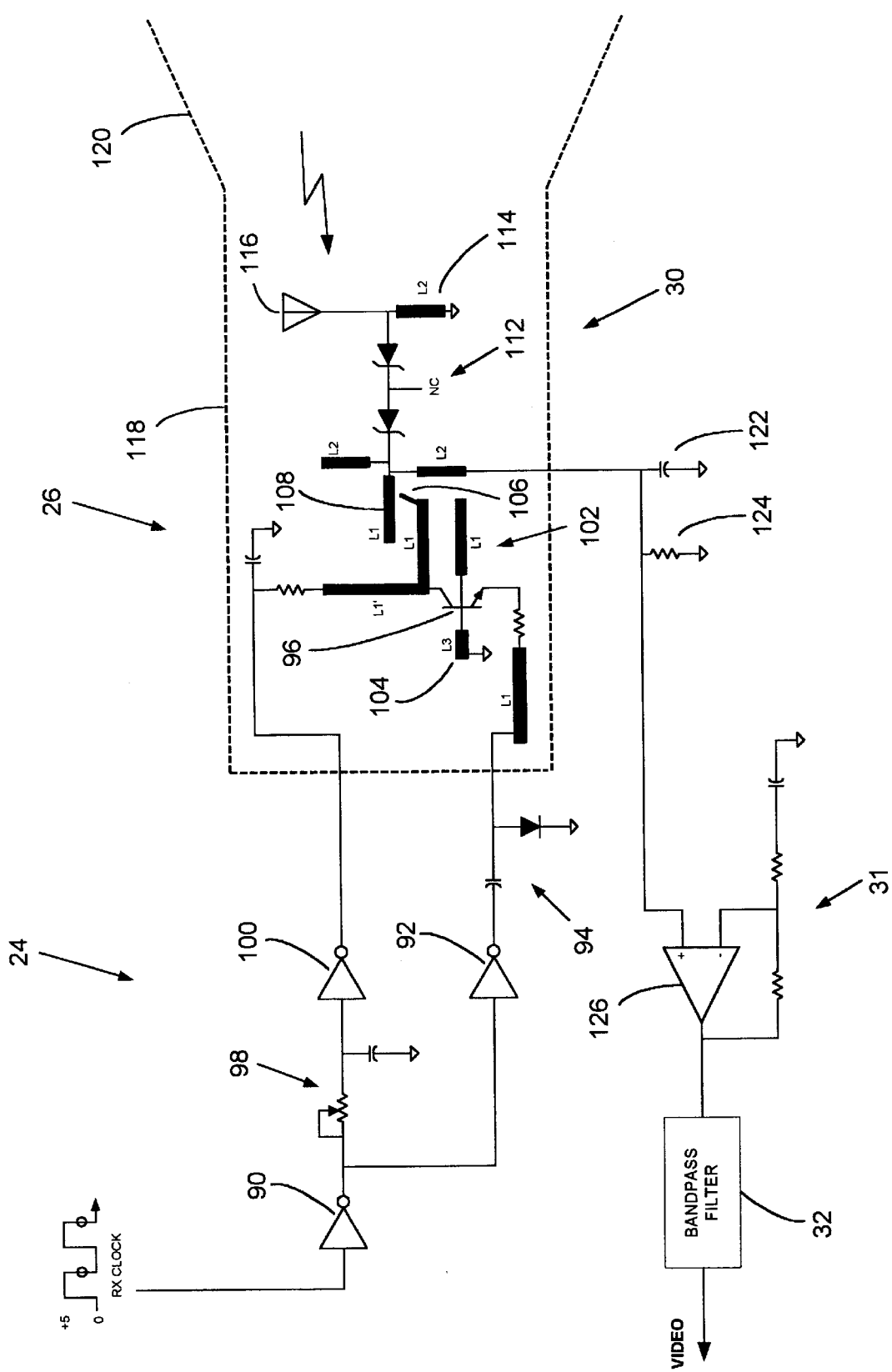
FIG. 5 is a schematic diagram of a pulse driver, a silicon bipolar transistor oscillator, and a harmonic sampler of the present invention.

FIG. 5 is a detailed schematic of a pulse driver 24, a local oscillator 26, and a frequency quadrupling harmonic sampler 30 of the present invention. The configuration of this pulse driver is different from that of FIGS. 2 and 4. An RX clock signal is coupled through inverters 90 and 92, through capacitor-diode AC level shift network 94 and through microstrip resonator L1, to the emitter of microwave oscillator transistor 96. Whenever the RX clock goes low, transistor 96 is biased on and commences to oscillate within a nanosecond.

The same negative going clock edge that biases-on transistor 96 also propagates from inverter 90 through an RC delay network 98 and inverter 100 through another microstrip resonator L1' to the collector of transistor 96. Thus, a negative-going edge appears at the collector shortly after the emitter of the oscillator swings negative. The first edge, in the emitter circuit, biases the oscillator on and the second edge, in the collector circuit, biases it off, i.e., drives the collector bias to zero so oscillations cease. The propagation delays of inverters 92 and 100 are matched and cancel, so the difference in edge timing, which sets the oscillation time, is precisely determined by adjustable RC network 98. Experiments show that the stability of the RF oscillation can be maintained to better than 100 ps in width over a wide temperature range by using this "dual bias-path" approach. This circuit has been described in co-pending application "Pulsed RF Oscillator and Radar Motion Sensor," Ser. No. 09/073,159, by McEwan.

Microwave oscillator transistor 96 is connected to quarter-wave resonator microstrips 102 (of length L1) that define its operating frequency, which is typically 6 GHz or the $4^{th}$ sub-harmonic of 24 GHz. A short microstrip 104 of nonresonant length L3 in the base circuit provides inductance that is converted into a negative resistance by transistor 96, which is essential for oscillation in this type of oscillator. One of the microstrip resonators has a short wire or metal tab 106 attached to it to fine-tune the oscillator. During production the tab 106 can be bent to vary its capacitance to ground and thereby tune the RF frequency. Alternatively, a metal screw can be brought close to one of the microstrips for fine-tuning. This tuning sets the receiver center frequency to 24.1 GHz, for example.

The receiver bandwidth is set by the width of the RF pulse generated by transistor 96. For a 6 GHz RF pulse width of 2 ns, the receiver bandwidth at the $4^{th}$ harmonic is 500 MHz wide. Wide bandwidth is needed to receive the short pulses employed by the present invention.

RF oscillations at 6 GHz are coupled from the oscillator to microstrip 108 of length L1, which is connected along with other microstrips L2 to harmonic sampling diodes 112, which are connected to receive antenna 116. Diodes 112 are a series pair for reasons previously described with reference to FIG. 4. The cathodes of diodes 112 are driven with 6 GHz oscillations from microstrip 108. The amplitude of the oscillations and the bias conditions on the diodes are such that only the tips of the RF sinusoids drive the diodes into conduction. Typically, the conduction times may be about 20-picoseconds for each of perhaps a dozen sinewave cycles contained in each RF pulse from transistor 96. Since 20 ps corresponds to a half cycle duration of a 24 GHz RF sinusoid, sampler diodes 112 are able to efficiently sample 24 GHz signals appearing at the sampler input at antenna 116, i.e., across quarter-wave microstrip 114 of length L2. The microstrips L2 are approximately one-quarter wavelength long at the received signal frequency, i.e., 24 GHz. Antenna 116 is also a resonant antenna, one-quarter wavelength long, at the received signal frequency.

The RX clock has a typical frequency of 1–10 MHz, so diodes 112 conduct frequently and cause a steady pulsed current to flow. This current charges capacitor 122 to an equilibrium voltage set by bias resistor 124. Bias resistor 124 forms a return path for the average rectified detector current; consequently the conduction angle, or fraction of the 6 GHz sinewave tips that drive the diodes into conduction are influenced by the value of the bias resistor 124.

RF signals at 24 GHz that appear across input microstrip 114 add algebraically with the 6 GHz RF pulses from microstrip 108 and cause a modulation in detection voltage across resistor 124. This detected signal is amplified by amplifier 31 (formed of op amp 126) and filtered by bandpass filter 32 to produce a baseband video signal. Microstrip 114 provides input filtering to select the desired harmonic to be sampled, such as 24 GHz. Input filtering is not necessary for operation, but it helps eliminate unwanted out-of-band signals.

Quarter wave microstrip 108 provides an RF short at 24 GHz to prevent RF leakage out of the waveguide and to amplifier 31. It also enhances the detection efficiency of diodes 112.

This circuit uses a silicon bipolar transistor as the local oscillator since silicon bipolar microwave oscillators exhibit much lower noise than GaAsFET microwave oscillators. The noise penalty associated with sub-harmonic sampling is more than compensated-for by the low noise of the silicon bipolar oscillator. Further advantages include low cost, a relaxed printed circuit layout, and freedom from injection locking on external 24 GHz signals. Transistor 96 is a NEC NE68533, Schottky sampling diode 112 is a HP type HSMS-286C, logic inverters 90,92, and 100 are type 74AC04, and the op amp 126 is a TI type TLO71.

The operation of this sampler circuit differs from a conventional harmonic sampler in that it has a high impedance output, rather than the usual 50 ohm output. Further, the output circuit is configured to peak detect extremely short RF pulses and hold the peak from one clock cycle to the next in response to controlled timing. This is accomplished by making the capacitance microstrip 108 sufficiently large to not discharge between pulses. In some cases, stray capacitance is sufficient (such as in FIG. 4). The sampler integrates detected RF peaks across many RX clock cycles to reduce noise and interference. It is similar in structure to co-pending application "Charge Transfer Wideband Sample-Hold Circuit" Ser. No. 09/084,502, by McEwan.

The entire oscillator circuit 26 and sampler 30 are located inside a waveguide beyond cutoff 118 at 6 GHz to reduce spurious radiation at the local oscillator frequency. Thus, waveguide 118 is somewhat higher than one quarter-wavelength high (to allow the quarter-wave antenna to fit) and one-half wavelength wide at 24 GHz. A horn 120 is coupled to the waveguide to provide gain and reduce sidelobe response. In one prototype, the horn flares from 4×6 mm to 20 mm by 50 mm and provides about 18 dB gain at 24 GHz.

Figure 6A:
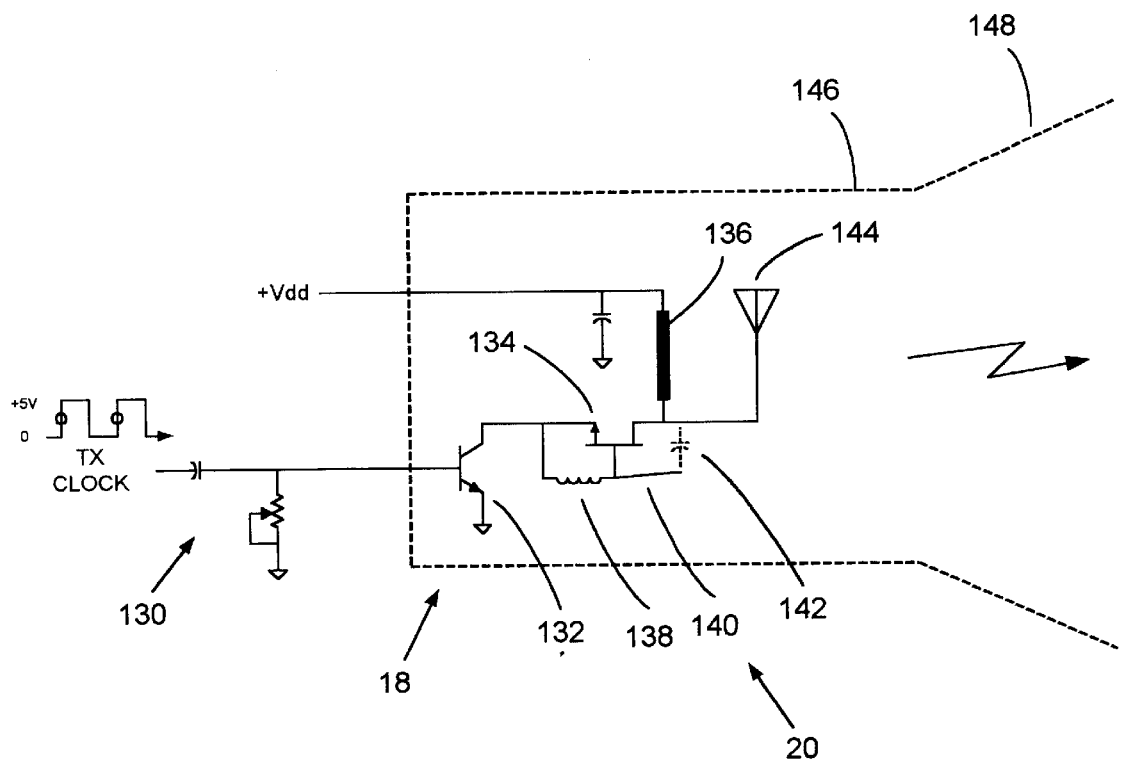
FIG. 6a is a schematic diagram of a fast driver and short pulse fundamental oscillator of the present invention.
Figure 6B:
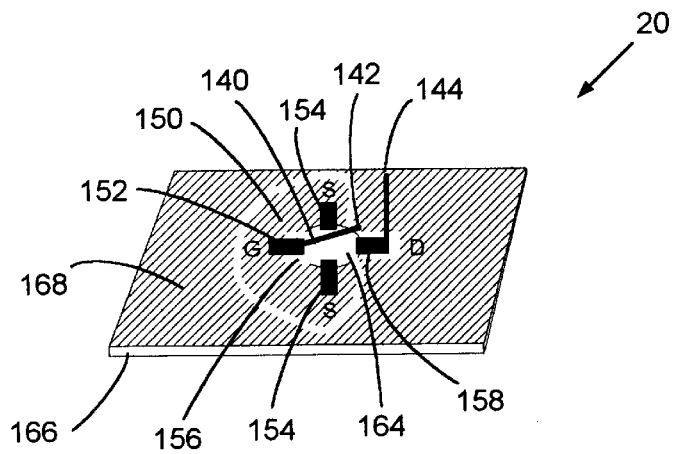

FIG. 6a is a detailed schematic of the pulse driver 18 and the fundamental frequency oscillator 20 of the present invention. A TX clock signal is coupled to an RC differentiation network 130 and then to a fast pulse driver 18, substantially comprised of driver transistor 132, which is coupled in a totem pole configuration to 24 GHz oscillator GaAsFET 134. The rising edge of the TX clock biases-on transistor 132 for a duration set by differentiation network 130, which is adjustable to produce conduction times of 0 to 10 ns, typically. Accordingly, the RF oscillation time of the GaAsFET can be set from 0 to 10 ns. Quarter-wave microstrip 136 provides a steady +3 to 5 volts DC bias to the GaAsFET. The GaAsFET operates at zero gate-source bias via inductor 138. When driver transistor 132 switches the GaAsFET source to ground, the GaAsFET automatically becomes biased-on—it is a depletion mode device that fully conducts with zero gate-source bias. Silicon bipolar transistor 132 is a NEC type NE68533 and GaAsFET oscillator transistor 134 is type NE42484A by NEC.

A quarter-wave radiator element 144 is connected to the GaAsFET, and both are located inside a waveguide 146 for shielding; waveguide 146 is coupled to a horn 148 to provide gain and reduce sidelobe radiation. The frequency of oscillation is set by a transmission line, or wire, 140 which is somewhat shorter than one-quarter wavelength at 24 GHz and which is connected to the gate and extends toward the drain. The frequency of oscillation is further set in combination with stray coupling capacitance 142. When element 140 is a wire, it can be bent to adjust stray capacitance 142 and thereby fine-tune the oscillator frequency.

FIG. 6b provides details of the physical layout of the fundamental frequency oscillator of FIG. 6a. The layout is based on a 1.78 mm diameter 4-lead ceramic SMT package, such as the NE42484A by Nippon Electric Corp. A hole 164 is drilled in a printed circuit substrate 166 that has metallization 168 on at least one side. The body of the transistor is inserted into the hole up-side-down. The gate lead 152 and source leads 154 are soldered to a common metallized area 150 with a small relief 156 where metallization is backed away to provide the inductance 138 of FIG. 6a. Resonator wire 140 is soldered to the gate lead 152 and angled to provide a gap with the drain lead 158, thereby forming a stray coupling capacitance 142. Bending wire 140 closer to the drain lead lowers the frequency of oscillation. The drain lead 158 is connected to a quarter-wave monopole antenna 144, which is further located in the waveguide 146 of FIG. 6a. FIG. 6b depicts a unique arrangement to produce near-mm wave oscillations with a SMT transistor having package dimensions on the order of one-quarter wavelength.

Although the invention has been described with reference to a 24 GHz system because of the high interest in this frequency, the principles of the invention can be applied to other frequencies, e.g., 10.5 GHz and 38 GHz. The techniques using harmonic transmit pulses and sub-harmonic sampling can be similarly applied.

Changes and modifications in the specifically described embodiments can be carried out without departing from the scope of the invention which is intended to be limited only by the scope of the appended claims.

What is claimed is:

1. A short pulse microwave transceiver apparatus comprising:
   a transmit clock for generating a transmit clock signal;
   a pulsed transmit oscillator for producing transmitter RF bursts in response to the transmit clock signal;
   a transmit antenna connected to the transmit oscillator to transmit the transmitter RF bursts;
   a receive clock for generating a receive clock signal;
   a pulsed local oscillator for generating gating RF bursts in response to the receive clock signal;
   a harmonic sampler connected to the pulsed local oscillator;
   a receive antenna connected to the harmonic sampler to receive RF bursts;
   wherein the gating RF bursts from the pulsed local oscillator gate the harmonic sampler to detect RF bursts received by a receive antenna;
   circuitry responsive to the harmonic sampler to provide a detected baseband output.

2. The apparatus of claim 1 wherein the pulsed transmit oscillator is a pulsed harmonic oscillator.

3. The apparatus of claim 1 wherein the pulsed local oscillator operates at a sub-multiple of the received frequency of the microwave signal.

4. The apparatus of claim 1 wherein the pulsed transmit oscillator and transmit antenna are located inside a waveguide.

5. The apparatus of claim 1 wherein the pulsed local oscillator, harmonic sampler, and receive antenna are located inside a waveguide.

6. The apparatus of claim 1 wherein the pulsed transmit oscillator and the pulsed local oscillator are phase coherent with their respective transmit and receive clocks.

7. The apparatus of claim 6 further comprising a pulse driver between the pulsed oscillators and the clocks to shock excite the oscillators into phase coherent microwave oscillation.

8. The apparatus of claim 1 wherein the receive clock operates at about a 10 Hz–10 kHz offset frequency from the transmit clock.

9. The apparatus of claim 1 wherein the receive clock operates with swept timing relative to the transmit clock.

10. The apparatus of claim 1 wherein at least one of the transmit or receive clocks is modulated in frequency, phase or amplitude for purposes of conveying information, spectrum spreading, or channelizing.

11. The apparatus of claim 1 wherein the pulsed transmit oscillator is a fundamental frequency pulsed oscillator.

12. The apparatus of claim 1 wherein the pulsed transmit oscillator comprises a pulsed microwave oscillator operating at a sub-multiple of the transmit frequency.

13. The apparatus of claim 1 wherein the harmonic sampler comprises anti-parallel diodes having first and second nodes, an RF input being coupled to the first node, the pulsed local oscillator being coupled to the second node.

14. The apparatus of claim 1 wherein the harmonic sampler comprises a detector diode having first and second nodes, an RF input being coupled to the first node, the pulsed local oscillator being coupled to the second node.

15. The apparatus of claim 1 wherein the transmit and local oscillators are pulsed on for less than 100 ns.

16. The apparatus of claim 1 wherein the transmit and local oscillators are pulsed on for less than 10 ns.

17. The apparatus of claim 1 wherein transmit and local oscillators are pulsed on for less than 1 ns.

18. A short pulse microwave transmit oscillator comprising:
a pulsed microwave oscillator operating at a sub-multiple of a transmit frequency;
an antenna connected to the oscillator, the antenna being resonant at the transmit frequency.

19. The transmit oscillator of claim 18 wherein the pulsed microwave oscillator and resonant antenna are located inside a waveguide.

20. The transmit oscillator of claim 19 wherein the waveguide is dimensioned to cutoff below the transmit frequency, to reduce or eliminate sub-harmonic emissions.

21. A short pulse microwave harmonic sampler comprising:
a pulsed local oscillator;
anti-parallel detector diodes having first and second nodes;
an RF input coupled to the first node;
the pulsed local oscillator being coupled to the second node.

22. The harmonic sampler of claim 21 further comprising a baseband output port connected to the second node of the detector diodes.

23. The harmonic sampler of claim 22 further comprising a quarter-wave resonator connected to the second node of the detector diode pair to provide an RF short circuit at the RF input frequency.

24. The harmonic sampler of claim 21 wherein the pulsed local oscillator operates at an even sub-multiple of the RF input frequency.

25. The harmonic sampler of claim 21 wherein the pulsed local oscillator is a GaAsFET.

26. The harmonic sampler of claim 21 wherein the pulsed local oscillator is a bipolar transistor.

27. The harmonic sampler of claim 21 wherein the pulsed local oscillator is driven from an emitter follower connected to a logic gate.

28. The harmonic sampler of claim 21 wherein each detector diode comprises a series pair within a common package.

29. The harmonic sampler of claim 21 wherein the sampler is an integrating sampler which coherently integrates pulses from multiple receive clock repetitions.

30. The harmonic sampler of claim 21 wherein the pulsed local oscillator and the detector diodes are located inside a waveguide.

31. A short pulse microwave harmonic sampler comprising:
a pulsed local oscillator;
a detector diode having first and second nodes;
an RF input connected to the first node;
the pulsed local oscillator being coupled to the second node.

32. The harmonic sampler of claim 31 further comprising a baseband output port connected to the second node of the detector diodes.

33. The harmonic sampler of claim 32 further comprising a quarter-wave resonator connected to the second node of the detector diode pair to provide an RF short circuit at the RF input frequency.

34. The harmonic sampler of claim 31 wherein the pulsed local oscillator operates at an even sub-multiple of the RF input frequency.

35. The harmonic sampler of claim 31 wherein the pulsed local oscillator is a GaAsFET.

36. The harmonic sampler of claim 31 wherein the pulsed local oscillator is a bipolar transistor.

37. The harmonic sampler of claim 31 wherein the pulsed local oscillator is driven from an emitter follower connected to a logic gate.

38. The harmonic sampler of claim 31 wherein the detector diode comprises a series pair within a common package.

39. The harmonic sampler of claim 31 wherein the pulsed local oscillator and the detector diodes are located inside a waveguide.

40. A short pulse microwave oscillator comprising:
an oscillator transistor having gate G, source S and drain D nodes;
an inductance connected between S and G;
a transmission line or wire shorter than one-quarter wavelength having a first and second end, with the first end connected to G and the second end coupled to D through stray capacitance.

41. The oscillator of claim 40 further comprising a switching transistor connected in totem-pole fashion to node S.

42. The oscillator of claim 40 wherein the oscillator transistor is located inside a waveguide.

43. A method of transmitting and receiving short microwave pulses, comprising:
transmitting pulses from a first microwave oscillator;
pulsing a second microwave oscillator with controlled timing to gate a harmonic sampler;
sampling pulses transmitted from the first oscillator and reflected from an object with the harmonic sampler;
integrating two or more samples from the harmonic sampler.

44. The method of claim 43 wherein transmitting pulses comprise transmitting pulses from a harmonic oscillator.

45. A method of transmitting and receiving short microwave pulses, comprising:
operating a pulsed transmit oscillator at a first frequency;
coupling the pulsed transmit oscillator to a resonant antenna which is resonant at a second frequency which is a harmonic of the first frequency to produce a transmitted signal at the second frequency;
receiving a reflected signal at a resonant antenna which is resonant at the second frequency;
harmonically sampling the received signal with a third frequency which is a sub-harmonic of the second frequency.

* * * * *